June 9, 1942.    H. H. McKEE ET AL    2,285,736
FRANKFURTER LAYOUT
Filed April 10, 1940
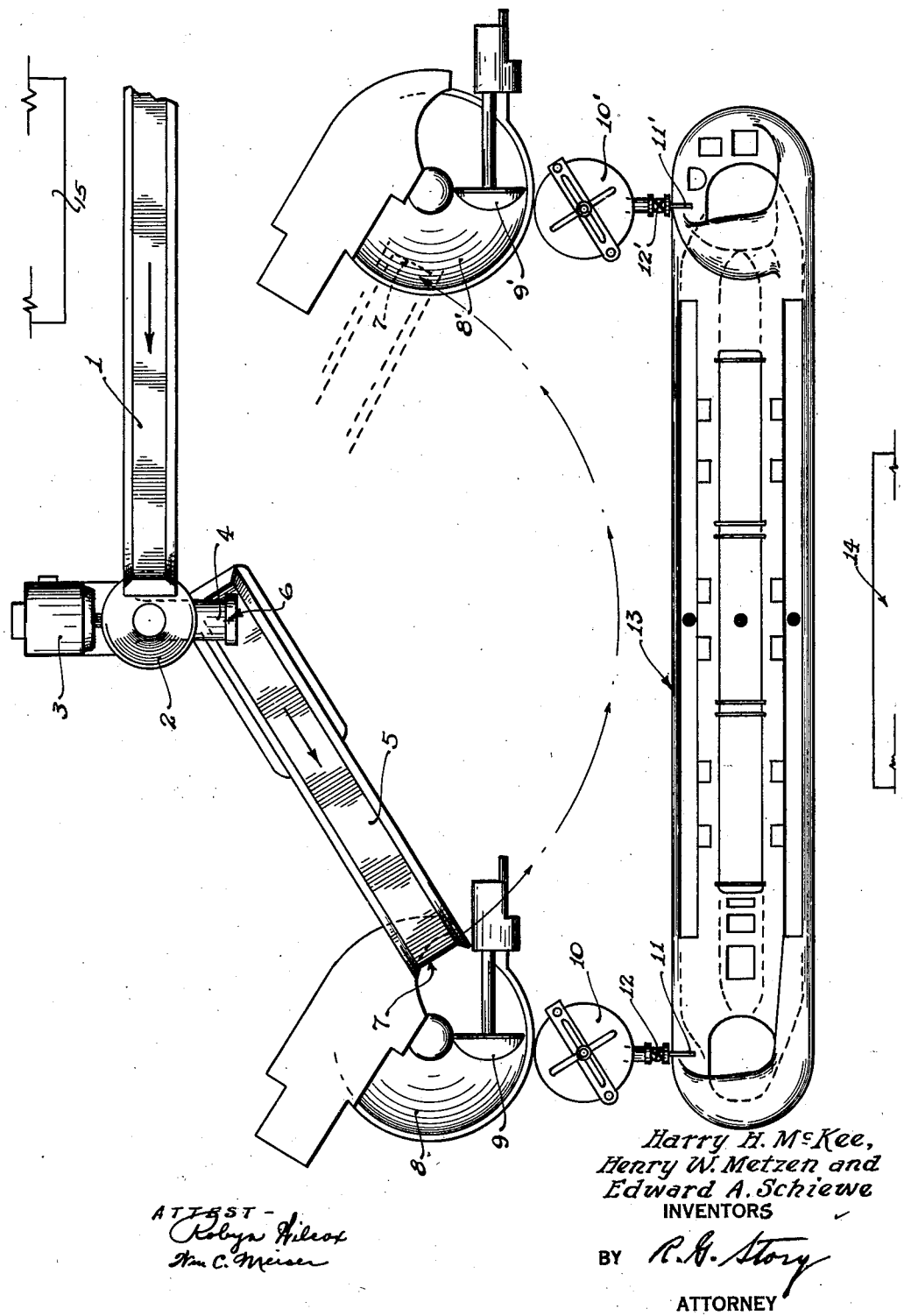
Harry H. McKee,
Henry W. Metzen and
Edward A. Schiewe
INVENTORS
BY R. H. Story
ATTORNEY Patented June 9, 1942

2,285,736

UNITED STATES PATENT OFFICE 2,285,736

FRANKFURTER LAYOUT

Harry H. McKee, Henry W. Metzen, and Edward A. Schiewe, Chicago, Ill., assignors to Industrial Patents Corporation, Chicago, Ill., a corporation of Delaware Application April 10, 1940, Serial No. 328,836

3 Claims. (Cl. 17—1)

This invention relates to the manufacture of sausage.

One of the objects of this invention is to provide for a continuous production of sausage product.

Another object of our invention is to provide an improved layout for a sausage manufacturing room operated on an industrial scale.

Another object of our invention is to provide a layout for a sausage manufacturing room for display purposes.

Other objects of our invention will be apparent from the description and claims which follow.

In the past the manufacture of sausage has required very expensive handling of the product in the course of manufacture. In many of the older sausage plants the meat is ground and chopped in one room and the stuffing and linking are done in another. In more modern plants, the grinding and stuffing and linking had been in one room, but the steps in the process were still essentially the same. In both the old and more modern plants the curing, smoking, cooking and washing are done in separate rooms, which necessitates additional handling by hand. Briefly the manufacture of sausage comprises the following steps:

The meat to be used in the manufacture of sausage is kept in a cold storage room. As meat is desired for manufacture into sausage, it is boned, loaded by hand into trucks and wheeled to a position adjacent to the meat hasher in another room. The meat is taken by hand from the truck and loaded into the hasher. A truck is placed under the discharge mouth of the hasher so that the ground meat is caught therein. Most sausage is made from a combination of different kinds of meat, and it is customary to grind each kind separately, loading into separate trucks. Thereafter it is placed in a mechanical mixer in the proper proportions, curing material added, and the whole mixed thoroughly, or the various kinds of hashed raw material are weighed and formulated in a silent cutter together with curing ingredients, and then chopped to a fine, homogeneous emulsion. Usually a quantity of ice is added at this operation in order to keep the temperature of the meat as low as possible as heating during the chopping process, which normally would be present, is very detrimental to the quality of the product. The time necessary for working a batch of meat in the silent cutter varies from two or three to eight or ten minutes, depending upon the fineness or texture desired. After this chopping, the emulsion is removed from the cutter, and again loaded into trucks. Trucks loaded with the finely ground meat are then moved, by hand, to a position adjacent to the sausage stuffer, which is often in another room. The stuffer is always loaded by hand with the finely comminuted sausage meat from the silent cutters. Casings are slipped over the nozzle of the sausage stuffer, and the operator, by manipulating the valve on the nozzle, fills the casings with the finely comminuted meat, the stuffed sausage being pushed from the nozzle by the force of the pressure within the stuffer onto the stuffing and linking table which is immediately adjacent thereto. At the linking table the stuffed sausage casings are linked by hand, and the linked sausages placed upon sausage sticks. The loaded sausage sticks are placed upon trucks or trolleys provided with racks for holding such sticks, and the trucks and trolleys are moved by hand in succession to a curing or tempering room, a smoke house, a cooking chamber where they are cooked either by placing the loaded sausage sticks in a hot water cooker or passing the loaded truck or trolley under hot water sprays, a chilling room and finally into another room where the product can be unloaded from the sticks and packed. In the manufacture of dried sausage which is not smoked, the smoking step is, of course, eliminated, but in any event, it is evident that the removal of product from one room to another calls for a large amount of hand labor.

The object of this invention is to eliminate as much as possible the hand labor involved in the manufacture of sausage, and to provide for its manufacture by a continuous process. A preferred layout of a sausage kitchen is shown in the accompanying drawing which forms a part of this specification.

The raw materials are kept in a cold storage room indicated generally by the numeral 15 and are placed upon belt conveyor 1 in the proportions called for by the formula of the particular manufacturer or particular type of sausage. The conveyor 1 carries the pieces of boneless meat to and above hasher 2 where it is dropped into the hasher. Hasher 2 is operated by motor 3, and the ground meat is discharged through spout or nozzle 4. As ground meat is discharged from hasher 2 it falls upon a second belt conveyor 5, preferably of a pivotable type with the center of its arc of travel 6 placed below the discharge spout 4 of hasher 2. The outer or discharge end of said conveyor 7 reaches over a plurality of silent cutters 8 and 8' which are arranged in a semi-circle about hasher 2 and at points equidistant from the center of rotation 6 of the pivoted conveyor 5.

Preferably there should be a plurality of silent cutters, as a hasher will ordinarily handle several times as much meat as a silent cutter, as meat goes through the hasher only once, while in the silent cutter it is passed through the cutting knives many times, so that it is desirable for the meat from the hasher to be loaded into a second silent cutter while the first is in operation.

In the drawing shown the silent cutters 8 and 8' are equipped with over-the-edge unloaders 9 and 9', respectively, which, upon completion of the comminuting and mixing of the meat, are lowered into the meat cutter bowls and automatically remove the comminuted meat over the edge of the silent cutter.

Sausage stuffers 10 and 10' are located immediately adjacent to silent cutters 8 and 8', respectively, and are so located as to be under the point of discharge of meat from the silent cutter. Each stuffer is equipped with a nozzle 11 and 11', respectively. The casings are placed over the nozzles, and meat admitted to the casings by opening valves 12 and 12', respectively. As the casing is filled with sausage meat it is pushed by the pressure in the stuffer out upon a linking table 13. In the preferred embodiment the table is equipped with racks upon which sausage sticks may be placed so that the linked sausages may be loaded upon the sausage sticks at the time of linking.

In the preferred layout of our invention we use a curing, smoking and cooking device 14 of the type described and claimed in the copending application of Harry H. McKee, entitled Continuous frankfurter process and apparatus, filed April 19, 1940, Serial No. 330,505, which, briefly, consists of an endless chain conveyor passing through a curing room, smoke houses, finishing room, washing room, cooking room, chilling rooms, drying room, and chilling room. The chains are adapted to carry loaded sausage sticks through these respective rooms in a continuous process. The loading end of this device is located adjacent to the sausage linking table so that an operator may load the sausages from a linking table and place them upon a conveying means for passage to the curing room, smoking rooms, finishing room, washing room, cooking room, chilling rooms, drying chamber, and final chilling room.

In the operation of a sausage kitchen such as disclosed in our invention the usual pieces of boneless meat used in the manufacture of sausage are placed upon the conveyor 1 in the meat cooler in the proportion desired by the manufacturer, and conveyed to hasher 2, where the meat is automatically dumped into the hasher, from which it is ejected onto pivoted conveyor 5. The ground meat is conveyed by pivoted conveyor 5 to one of the plurality of silent cutters 8 and 8'. The ground meat is dumped automatically from pivoted conveyor 5 into one of the silent cutters, such as 8, and when that cutter is loaded with ground meat, the conveyor is swung to another silent cutter which in turn is loaded, etc. During the cutting operation the curing and seasoning ingredients and ice are added and they become thoroughly mixed in the cutting process. When meat has been comminuted to the necessary fineness and the seasoning ingredients thoroughly mixed, the over-the-rim unloader 9 is lowered into the cutting bowl, and the comminuted meat ejected over the rim and into sausage stuffer 10. The operator of the sausage stuffer may then stuff sausage casings in the usual manner, the casings being pushed out upon linking table 13 where they are linked by hand in the usual fashion. An operator removes the linked sausages and loads them upon sausage sticks passing through the curing, smoking and cooking devices shown generally by the numeral 14, or if detachable sticks are used, removes the loaded sticks from the linking table and places them upon the endless chain conveyor. The sausage passes through the necessary curing, smoking and cooking operations, and is removed from the sausage sticks at the discharge end of the device by another operator, whereupon the sausages may be packed for storage or shipping.

In the manufacture of coarsely ground sausage which does not require the fine comminuting furnished by the cutters 8 and 8', the curing ingredients could be added at the grinder and the ground meat delivered directly to a stuffer or preferably the meat cutter shown in the attached drawing would be replaced by a sausage mixer which would mix the meat and curing and seasoning ingredients thoroughly, without further comminuting them. From the mixer the mixed comminuted meat would be discharged into the sausage stuffer as heretofore described.

In the manufacture of dry sausages which are not smoked the smoking suggested above can be eliminated merely by removing the smoke from the smoke houses, and eliminating that step from the process.

Manifestly, the arrangement shown is capable of considerable modification by persons skilled in the art, and any such modifications as are in keeping with the description and claims which follow are considered to be within the present invention.

We claim:

1. In an apparatus for the production of sausage, the combination of a hasher, a plurality of cutters, and a pivotal conveyor, so disposed that the ground meat is automatically conveyed from the hasher to any one of the cutters by means of the pivotal conveyor, the center of the arc of travel of which is located below the spout of the hasher, the said cutters being arranged along the arc of travel of the outer end of said pivotal conveyor.

2. An apparatus for the production of sausage comprising a conveyor, a hasher for receiving meat from the conveyor, a second conveyor for receiving meat from the hasher, a plurality of cutters in spaced relationship for receiving meat from the second mentioned conveyor and for operating thereon, a plurality of sausage stuffers adapted to receive meat comminuted by the cutters, and a linking table positioned adjacent to the sausage stuffers and adapted to receive stuffed sausage casings therefrom, the second mentioned conveyor being pivotally mounted and adapted for pivotal movement to deliver meat from the hasher to the cutters.

3. An apparatus for the production of sausage comprising a conveyor, a hasher for receiving meat from the conveyor, a second conveyor for receiving meat from the hasher, and a plurality of cutters in spaced relationship for receiving meat from the second mentioned conveyor and for operating thereon, the second mentioned conveyor being pivotally mounted and adapted for pivotal movement to deliver meat from the hasher to the cutters.

HARRY H. McKEE.
HENRY W. METZEN.
EDWARD A. SCHIEWE.